July 13, 1948. R. E. PRENTICE 2,445,036
BED LATCH FOR CAMERAS
Filed July 3, 1946

INVENTOR.
RUSSELL E. PRENTICE
BY Henry W. Coughlin
Rodney C. Southworth
ATTORNEYS Patented July 13, 1948

2,445,036

UNITED STATES PATENT OFFICE 2,445,036

BED LATCH FOR CAMERAS

Russell E. Prentice, Celina, Ohio, assignor to General Aniline & Film Corporation, New York, N. Y., a corporation of Delaware Application July 3, 1946, Serial No. 681,191

3 Claims. (Cl. 95—40)

This application pertains to an invention in cameras, and more specifically to locking devices for the bed or closing member for the camera case. While the invention is described by reference to one embodiment thereof in a press type camera, it is by no means limited thereto and may be used in all cameras to which it is applicable.

It is an object of the invention to devise a camera in which the side of the case which opens and which may serve as a bed for a lens carrying member is retained in closed position by engagement of the lens carrying member with a complementary engaging surface in the adjacent side of the casing.

It is a further object of the invention to provide a construction within a camera wherein the camera casing may be opened and the bed dropped to active position by a slight turn of the focusing knob to release the latch.

Other objects will be apparent as the disclosure proceeds.

The invention is applicable to cameras, such as press type cameras, wherein one side of the casing may be swung about hinges to an open position, the lens assembly and bellows withdrawn from the casing to be carried by a lens carrying member slidable along tracks on the opened side of the casing which actually constitutes a lens supporting and focusing bed. The movable or sliding lens carrying member is generally freely slidable except for a certain amount of friction at some point so that it will remain in a set position. A so-called focusing knob is provided, either at the front face of the bed or at the side thereof, and this focusing knob, through a system of small gears and a rack, effects that movement necessary for extending the movable part inwardly or outwardly to effect focusing of the lens.

While a knob, such as a small knurled wheel, is usually employed for this function, any other convenient means may be used and the invention is not to be limited to any particular instrumentality for the purpose.

According to the invention, the movable lens carrying member is caused to be engaged by means, such as springs or other resilient members, for pushing it outwardly so that its outermost edge will project slightly beyond the adjacent edge of the bed. That edge, when so moved by the resilient means, snaps into or otherwise engages within a complementary notch or recess cut in the adjacent side of the camera casing, in most instances, the top of the casing.

The invention will be described in detail by reference to the accompanying figures of drawing, wherein.

Figure 1:
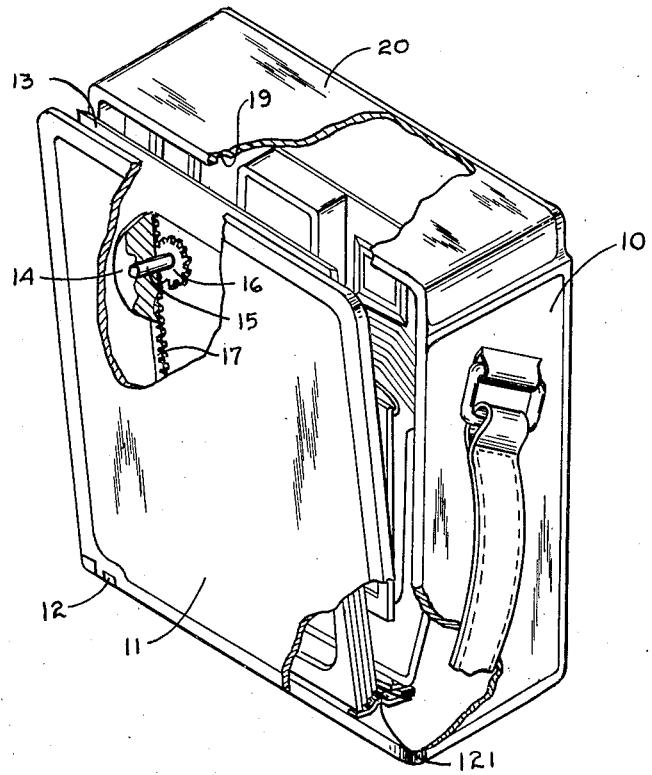
Fig. 1 is an isometric view, certain parts being broken away showing the general arrangement of parts in a press type camera to which the invention has been applied.

Now referring to the figures, the camera includes a casing 10, a front wall or door which will hereinafter be referred to as bed 11 and which is hinged to the casing by hinges one of which is indicated by numeral 12. As is well known to those skilled in the art, the bed 11 may be dropped to a more or less horizontal position or moved throughout approximately 90° of movement in which position it is temporarily retained by braces (not shown). The other parts of the camera include a bellows, lens, shutter, and the usual view finding and/or range finding devices, these being of conventional form and not necessarily shown or described here.

The lens assembly is slidable into and from the casing 10, and when bed 11 is dropped to open or active position, that lens assembly may be slid forwardly to a predetermined position with respect to a slidable, lens carrying member 13, which is movable along the bed 11 on certain tracks or other guiding means. When the bed 11 is raised or moved to closed position, the lens will, of course, have been previously pushed into the casing and the movable member 13 will have been racked to its innermost position by means of the focusing knob 14, or other lens focusing means. This focusing knob is fixed to a short spindle 15 and lies at one side of the bed member 11 broken away at that point to show the remaining parts which include a gear 16 and a rack 17 with which the gear meshes. Rotation of the focusing knob 14 causes a corresponding movement of the movable lens carrying member 13 and according to the prior art, that movement has been employed only for moving the lens as is necessary in focusing.

Figure 2:
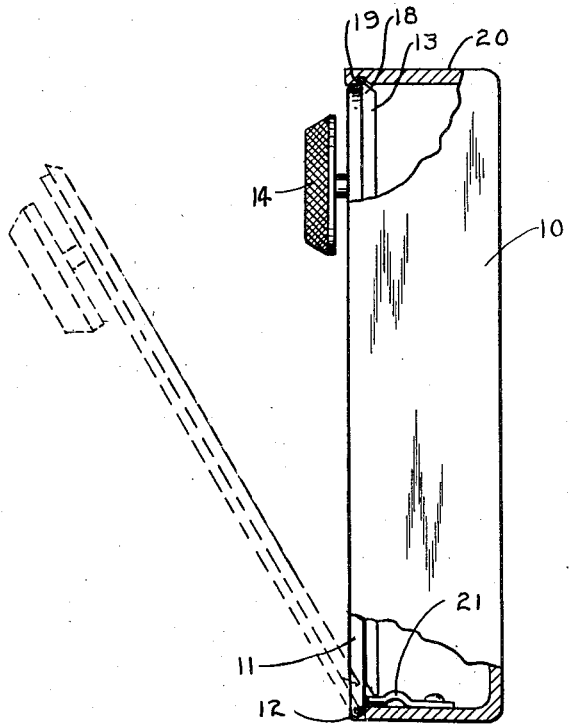
Fig. 2 is an elevation partly in section showing further details of the invention.

As shown more clearly in Fig. 2, the movable lens carrying member 13 is beveled at the top as at 18 and is engageable within a notch 19 in the top of the casing 20. At either side of the camera and enclosed within the casing are springs 21 which are effective when the bed 11 is closed, to urge the member 13 upwardly so that it will project beyond the top edge of the bed and will project into notch 19 when the casing has been completely closed. Due to the beveled construction, the closing of the bed actually causes the member 13 to move downwardly against the resilient springs 21 whereupon the springs force the member upwardly or into engagement with the notch when the parts have reached the full-line position, Fig. 2. The spring 21 may take any convenient form and, in fact, any resilient element which will permit the member 13 to be moved downwardly as the beveled end 18 engages the edge of the adjacent side of the casing and which will later push it upwardly into engagement with the notch will serve.

For opening the camera and moving the bed to its operative positive, the knob 14 need be turned just sufficiently to rack the member 13 downwardly against the springs 21 until the beveled edge clears the notch. Then the bed may be dropped to its horizontal or other operative position in the usual way. By constructing the camera parts as above described, it becomes unnecessary to provide special latching means and special levers or buttons as are commonly employed for releasing the bed when it is desired to move it to open position. It is also possible to unlatch and to open the camera with one hand.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a camera, the combination of a case one side of which is hinged and movable to and from an open or operative position in which it constitutes a bed, a lens carrying member movable along said bed, means positioned to remain outside the casing when the bed is closed, for moving said lens carrying member along the bed, complementary means at one side of the case with which said movable member is engaged when the camera casing is closed and by which engagement the bed is latched in closed position, resilient means for retaining said movable member in engagement with said complementary means in the casing, said means for moving the lens carrying member being effective for withdrawing it from the complementary engaging means when the casing is to be unlatched and opened.

2. In a camera, the combination of a case one side of which is hinged and movable to and from an open position in which it constitutes a lens supporting bed, a lens carrying member slidable along said bed, means for moving said lens carrying member along the bed for focusing including a knob positioned at the outside of said casing when the bed is closed and interengaging gears and a rack connecting said knob and lens carrying member, a notch in one side of said case for reception of the complementary edge of the lens carrying member, resilient means effective on said member only when the bed is closed for urging it into engagement with the notch when the bed is moved to closed position, said means for moving the lens carrying member for focusing also being effective to unlatch the complementary edge thereof from the notch when the camera case is to be opened.

3. In a camera casing, the combination of a case one side of which is hinged and movable to and from open position in which it constitutes a lens supporting bed, a lens carrying member slidable along said bed, means including a focusing knob projecting to the outside of said bed and casing when the bed is closed, a rack and at least one gear meshing with said rack and rotatable by said knob for moving the lens carrying member along the bed, a notch at the inner side of the top of said case engageable by the adjacent, complementary edge of the lens carrying member when said bed is moved to closed position, springs attached to the casing and engageable with said movable member as the bed is closed for resiliently urging it into engagement with said notch, the said complementary edge of the member being beveled so that as the case is closed, contact between the member and edge of the adjacent portion of the casing will cause the said member to flex said springs thereby to permit it to slide along the bed until it becomes engage within said notch.

RUSSELL E. PRENTICE.

REFERENCES CITED

The following references are of record in the file of this patent:

UNITED STATES PATENTS

| Number | Name | Date |
|---|---|---|
| 558,039 | Carlton et al. | Apr. 14, 1896 |
| 1,276,743 | Fisher | Aug. 27, 1918 |